Nov. 8, 1932.   A. E. YOUNG   1,887,254
MEASURING APPARATUS
Filed Oct. 20, 1931    3 Sheets-Sheet 1
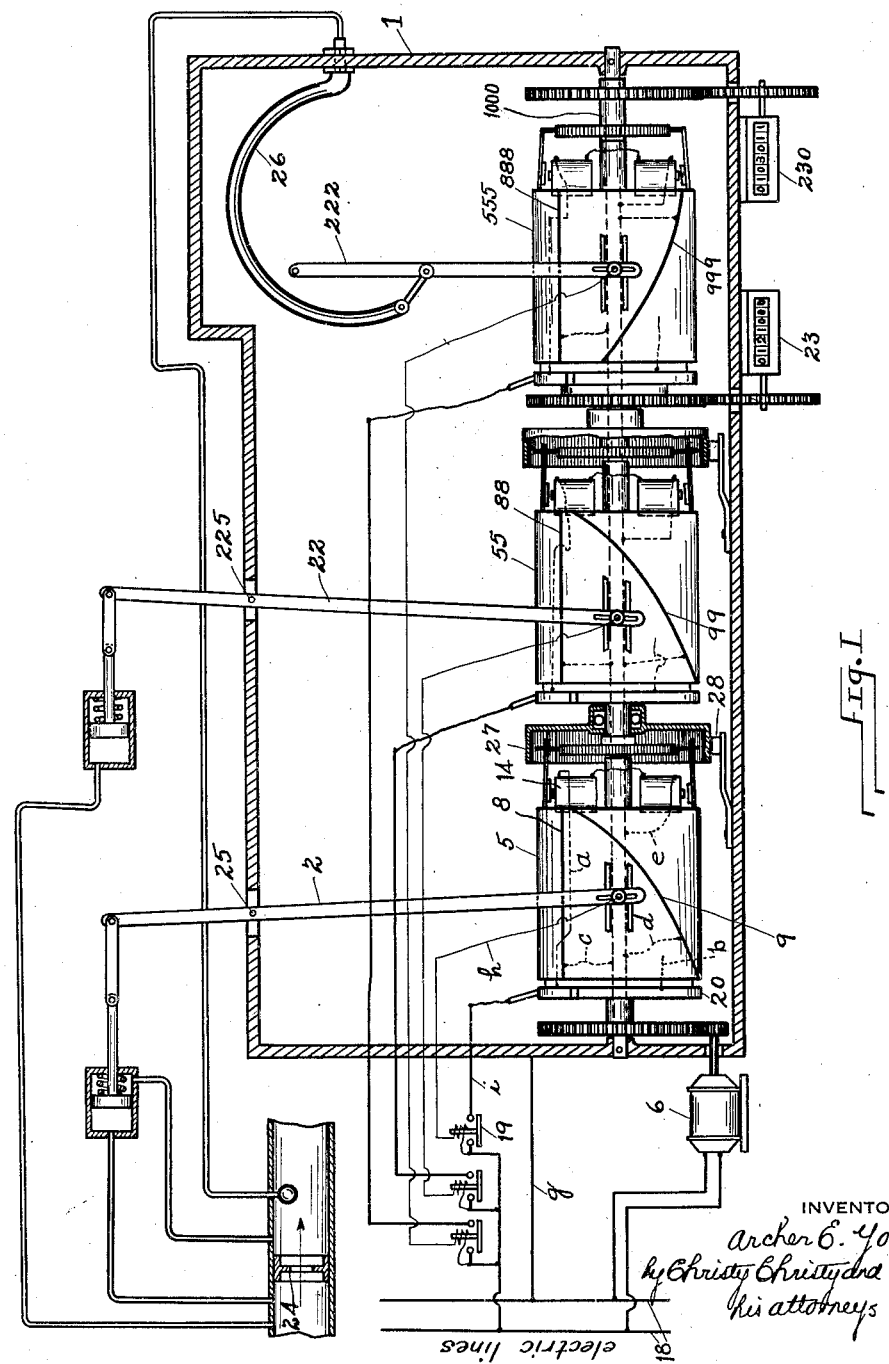

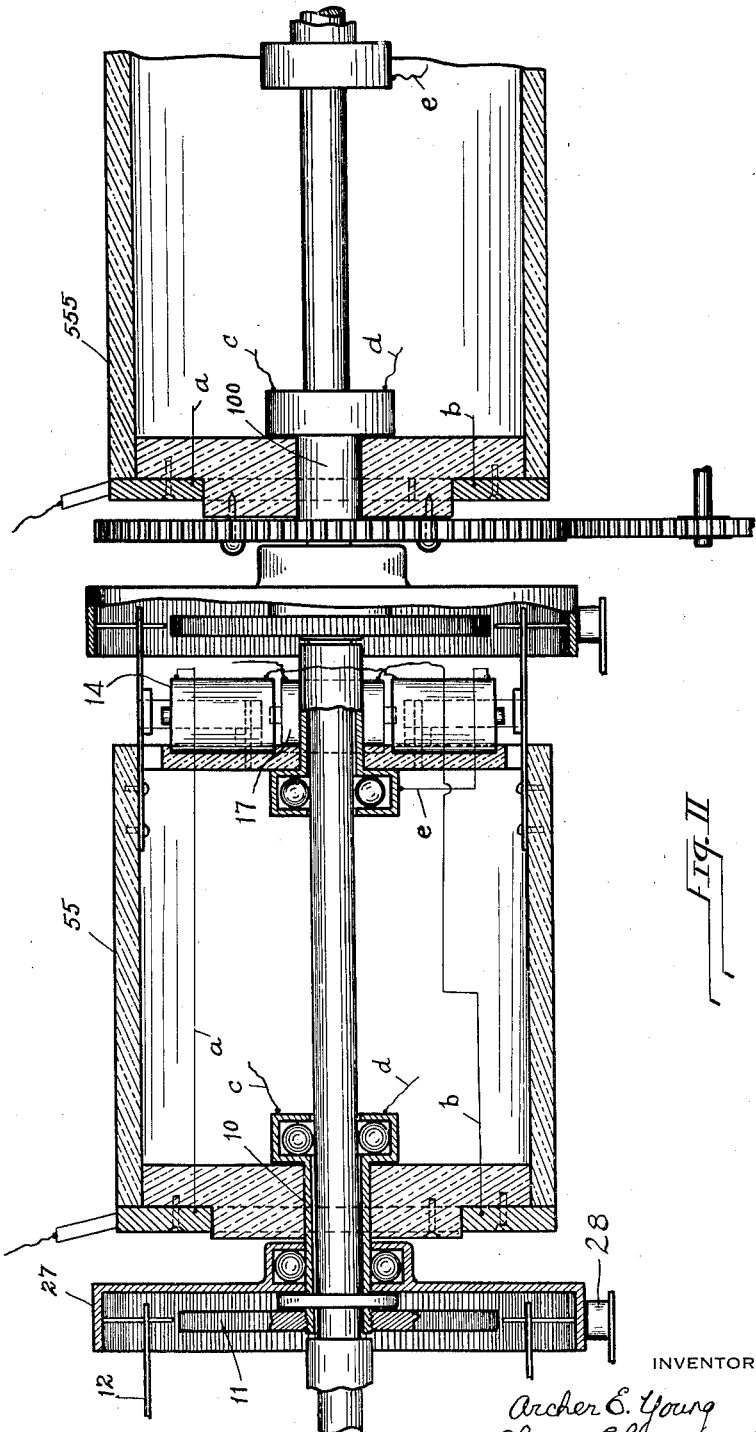

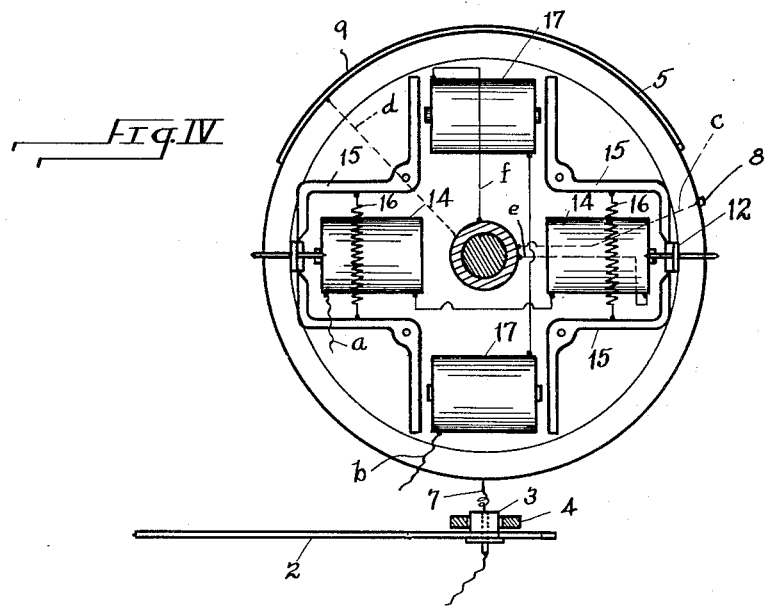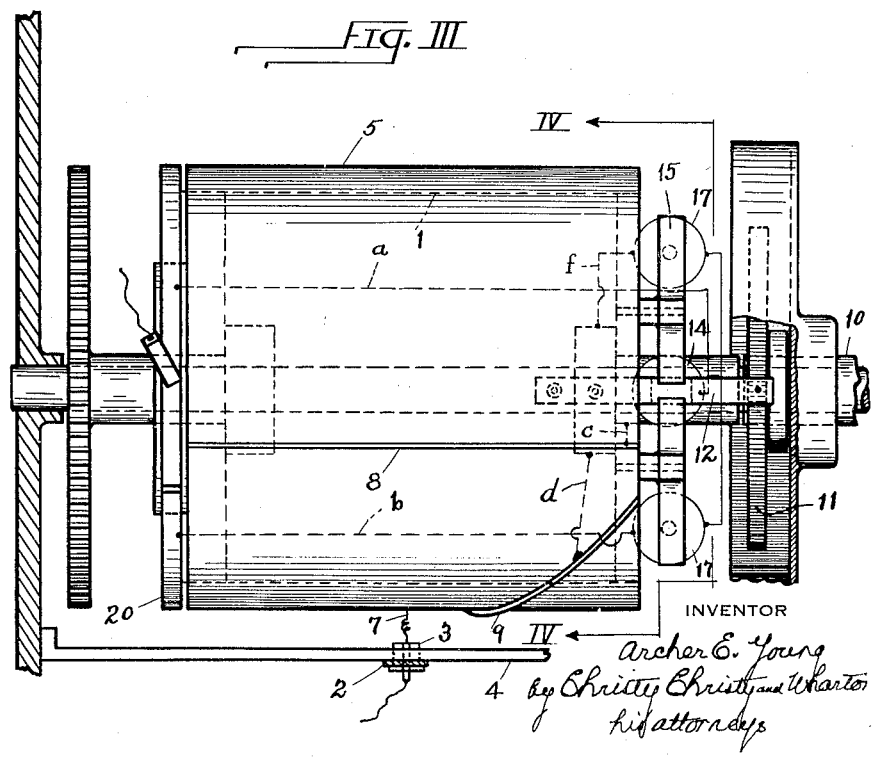

Patented Nov. 8, 1932

1,887,254

UNITED STATES PATENT OFFICE

ARCHER E. YOUNG, OF PITTSBURGH, PENNSYLVANIA

MEASURING APPARATUS

Application filed October 20, 1931. Serial No. 570,024.

My invention concerns apparatus for making summation of or determining the resultant of a plurality of variable quantities. It includes a constantly moving member, and a second movable member intermittently moved by the constantly moving member first named. The invention is found in the provision of means for imposing a load upon the constantly moving member, such means being effective to impose such load upon the constantly moving member during such time as the said constantly moving member is not driving the said second movable member. The purpose of the invention is that the constantly moving member shall, with substantial constancy, be carrying a load, and that the load, while differing from time to time in the course of operation, in character shall at all times be substantially the same in value, and so a condition tending to the disturbance of uniformity of operation shall be corrected, and greater accuracy effected. The invention finds practical application in apparatus for indicating the volume of gas flowing in a conduit, and in such application I shall show and describe it. The instrument which is here shown and described is, in its general features, the instrument which is shown and described in an application for Letters Patent of the United States, filed by me October 12, 1929, Serial No. 400,997, for measuring apparatus.

In the accompanying drawings, Fig. I is a view in section of an instrument adapted to afford, by direct reading of units of volume, the quantity of gas flowing through an orifice or other restricted passageway within a gas main. In this instrument, the means are found of making compensation for an otherwise varying load, which means so applied constitute an embodiment of this invention; Fig. II is a fragmentary view to larger scale, showing in axial section a portion of certain rotary members of the instrument of Fig. I; Fig. III is a fragmentary view in side elevation of a portion of the said rotary members; and Fig. IV is a view in section on the transverse plane indicated by the line IV—IV, Fig. III, showing the rotary members rotated through 180 degrees from the position in which they are shown in Fig. III.

Referring first to Fig. I of the drawings, a casing 1 is provided, within which a long lever 2 is pivoted. This lever 2, pivoted at 25, is organized, as diagrammatically indicated in Fig. I, with an orificed plate 24 in a gas main, in such manner that it swings in response to variation in the "differential pressure"—that is to say, in the pressure-drop from the upstream side to the downstream side of the orifice. Such elementary organization is well known, and requires no further illustration. It has, as I have already intimated, long been common practice to observe the range of swing of such an arm and, observing also by other particular means variations in the "static pressure"—that is to say in the actual pressure to which the gas stream is subject—to calculate the quantity of gas which during the time of observation actually passes through the orifice. Such procedure is complicated and time consuming and, though theoretically capable of affording accuracy, is subject to the practical difficulty of ascertaining with accuracy what the variations in actual pressure may be. And, in passing, I remark that in my apparatus there is the possibility of such minute shaping of the parts that each instrument may by reference to a normal be standardized, to afford under all conditions within the range of contemplated service substantially perfect accuracy.

The lever 2 at its distal end is slotted longitudinally and carries freely reciprocable in the slot a block 3 (cf. Figs. I and IV). Block 3 is engaged also by a guideway 4 which extends transversely to the length of arm 2. As the arm 2 swings in response to variation in the differential pressure of the gas flowing through the orifice, block 3 will move up and down in guideway 4, and, the arm 2 being relatively long and being so organized that within the limits of ordinary operation its angular range of swing is small, the movement of block 3 along the guideway will always be closely proportional to the variation in differential pressure. If it were a matter of direct reading of the position of the block along the guideway, the inaccuracy, due to the fact that the right-line movement of the block is not minutely proportional to the angular swing of the lever, would be inconsiderable; but, by virtue of the fact that the block cooperates with other mechanical parts, proportions may be so far modified and adapted as to eliminate even such a slight and inconsiderable inaccuracy.

In proximity to, and in parallelism with the movement of block 3 in its guideway, extends a constantly and uniformly advancing surface. In the particular instrument here illustrated, this surface is the surface of a cylinder 5, mounted for rotation on an axis parallel with the pathway of block 3 and rotated at constant speed by suitable means, in this case the motor 6. The block 3 is equipped with a brush 7 (of Figs III and IV), and the surface of the cylinder is provided with areas of contact so disposed that cylinder rotation will effect the periodic making and breaking of an electric circuit or electric circuits. Conveniently, the cylinder surface, otherwise non-conducting, carries strips 8 and 9 of conducting material. Strip 8 extends longitudinally upon the surface of the cylinder and parallel with its axis, and strip 9 is so particularly shaped and disposed that at successive points longitudinally of the cylinder the distance between the strips, measured circumferentially, is proportional to the square root of the distance at which the block 3, ranging longitudinally of the cylinder, is remote from a zero point. When the differential pressure in the gas main is zero, there is of course no flow; and, while that condition obtains, the lever 2 (Fig. I) is at the limit of its range of swing in counter-clockwise direction, and the brush 7 which block 3 bears is just free of contact with the strips 8 and 9. As the differential pressure increases from zero through the range of service value, the lever 2 swings clockwise, and the block 3 moves from the zero point from right to left, along the guideway 4; and at successive points in the range of block movement, the distance between the strips, measured circumferentially, is proportional to the square root of the distance at which block 3 stands remote from the zero point. It will be understood that in this respect the drawings are diagrammatic; no attempt has been made so to plot the position of strip 9 as to render the drawings a literal presentation of the equation stated.

A shaft 10 (cf. Figs. II, III, and IV) is mounted for rotation coaxially with cylinder 5. Shaft 10 carries integrally a clutch member, in the form of a disk 11. Cylinder 5 carries one or more clutch members, in the form of swinging arms 12, which extend longitudinally beyond the head of the cylinder and opposite the face of disk 11. The arms may be swung to and from engagement with the disk. The face of the disk and the outer ends of the arms are suitably adapted to serve the clutch purpose indicated. To such end, the face of the disk may be serrated, and the arms may terminate in teeth adapted to enter and to be withdrawn from engagement with the serrations. Such minute shaping of the parts is indicated in the drawings. Conveniently there are two arms 12, arranged in diametrically opposite positions on cylinder 5. The arms 12 may conveniently be made of resilient material and may be so mounted upon the cylinder which carries them as to stand normally in position of release with respect to their companion clutch member, the disk 11. From such normal position these arms are swung inwardly, against their inherent resilience, by means of electro-magnets 14. These magnets are borne by cylinder 5 and are so situated that, when energized, they attract and draw the arms inward; and, to effect this end, the arms are formed of magnetic material, or carry blocks of magnetic material suitably situated.

Cooperating with the arms 12 are spring latches 15, borne also by cylinder 5. In Fig. IV, the latches 15 are shown in inactive position bearing under the tension of springs 16 upon opposite surfaces of the arms 12. When, by the energizing of electro-magnets 14, the arms 12 are swung inward to clutch-closing position, the latches, which under the tension of springs 16 had been bearing laterally upon the sides of the arms, spring to place behind the arms, and hold them secure in their clutch-closing position.

A second pair of electro-magnets 17 is provided, borne also by cylinder 5, and so arranged that, when energized (in alternation with the energizing of magnets 14), they will be effective to swing the latches 15, against the tension of springs 16, from the latching position to which in consequence of the action of electro-magnets 14 they had swung, to unlatching position; and then the arms 12, freed of restraint, swing again, by virtue of their own elasticity, back to the position of clutch release.

By such provision, shaft 10 is caused to rotate in union with the motor-driven cylinder 5, so long as the clutch is closed. When the clutch is open, shaft 10 is at rest.

Electric control circuits are diagrammatically indicated. A supply line is indicated at 18, a relay at 19, and a collector ring at 20. The collector ring is borne by and upon the rotating shaft (a hollow shaft) of cylinder 5; the ring is composed of arc-shaped parts, insulated one from the other. One of the arc-shaped parts of the ring is electrically connected through the lead $a$ with the coils of magnets 14. The other arc-shaped part is connected through the leads $b$ with the coils of the magnets 17. The strips 8 and 9 are by leads $c$ and $d$ in constant electrical communication with the casing 1; the coils of magnets 14 are through leads $e$ in electrical communication with the casing 1; and the coils of magnets 17 are through the lead $f$ in communication with the casing.

When, in the course of cylinder rotation, the brush 7, with which block 3 is equipped, makes contact with strip 8, a relay circuit is closed, which may in Fig. I be traced from the source 18, through branch $g$, strip 8, brush 7, lead $h$, and the coil of relay 19, to the line again. Relay 19 then is operated, and current in full strength flows through lead $g$, coils of electro-magnets 14, lead $a$, ring 20, and lead $i$, to the line again. With the completion of this full strength current through the coils of the electro-magnets 14, the electro-magnets are effective to swing the clutch arms 12 against their inherent elasticity and to close the clutch, uniting with the rotating cylinder 5 the axially aligned rotating member 10. When the clutch arms 12 so swing to clutch-closing position, the spring-impelled latches 15 automatically close behind the clutch arms 12, and secure them in clutch-closing position. As in the continued rotation of the cylinder 5, the strip 8 breaks contact with the brush 7. Both the magnet-energizing circuit and the relay-actuating circuit will be broken. The relay then will open. The clutch, however, will remain closed by virtue of the latches 15.

It will be understood that by suitable proportioning of resistances the current which flows in the relay-actuating circuit first traced above may be relatively light, and that the magnet-operating circuit traced above may be relatively heavy, as it should be. And it will be particularly remarked that, whereas the relatively light relay-actuating circuit is completed through the contact of brush 7 upon the strip 8, the relatively heavy magnet-actuating circuit is not completed through the parts 7 and 8; accordingly, a tendency to sparking is avoided, a sparking which might occur on the making and breaking of a contact between brush 7 and strip 8, were the magnet-actuating circuit completed through that contact.

In the further rotation of the cylinder 5, the brush 7, borne by block 3, makes contact with strip 9. The same relatively light relay circuit is then completed, and relay 19 is closed. The relatively heavy circuit, which then by the closing of relay 19 is completed, is completed not through the coils of electro-magnets 14, but through the coils of the electro-magnets 17. (This by virtue of the fact that the ring 20 has turned, and the brush included in lead $i$ is bearing upon another arc of that ring.) The energizing of magnets 17 effects the opening of the latches 15; and, in consequence, the clutch arms 12, released from restraint, swing outward under spring tension, the clutch is opened, and the shaft 10, no longer driven, ceases to rotate.

It will be perceived that with every rotation of the cylinder 5 the shaft 10 turns through a fraction of a complete rotation, and that the value of that fraction will be greater or less, according to the circumferential distance between the strips 8 and 9 at the point at which the longitudinally movable block 3 stands. That distance, as has been explained, is proportional to the square root of the distance at which block 3 stands from zero; that is to say, it varies as the square root of the differential pressure under which the gas is flowing through the main. The extent of rotation of the shaft 10 then within the fixed time interval of one complete rotation of cylinder 5 is an indication of the quantity of gas which in that interval of time has passed through the orifice. It will be apparent that if a tally were driven by shaft 10, a suitable proportioning of parts (which might readily be done) would suffice to afford a reading in terms of volume of the quantity of gas passed—uncorrected, however, for variations in other circumstances.

Under field conditions, not only does the differential pressure vary in a flowing stream of gas, but the static pressure varies too; and, other things being equal, the quantity of gas passing varies as the square root of the static pressure. It is common, in the practical measurement of gas, to obtain volumetric measurement, corrected more or less perfectly for variations in differential pressure, to observe by other means the variations in static pressure, and then to make correction of the first-named measurement by calculation from the observed value of the static pressure. I have perceived that, not only may I employ a device, the duplicate of that already described, to express in angular extent of the turning of a shaft, and with correction for variations in static pressure, the quantity of gas which in a given interval of time passes an orifice, but I have further perceived that if I mount the cylinder of such a second device upon the driven shaft of the first, then the driven shaft of the second device will turn through an angle which in the constant interval of time of one revolution of cylinder 5 will be indicative of the quantity of gas passed, with correction for variations both in differential and in static pressure.

Turning again to Fig. I of the drawings, a second device, essentially identical with that already described, will be seen to be associated with the first; the cylinder 55 of the second will be understood to be carried integrally upon the driven shaft 10 of the first. The lever 22 of the second device, pivoted at 225, may be understood to swing in response to variation in the static pressure of the gas flowing in the main, by instrumentalities such as are diagrammatically indicated in the figure; and the arrangement of the contact strips 88 and 99 upon the cylinder of the second device may be understood to be such that for each rotation of drum 55 a shaft 100 (cf. Fig. II) turns through an angle which varies in value, proportionately to the square root of the value of the static pressure. When the two devices are so organized, the shaft 100 will turn through an angle whose value will be indicative of the quantity of gas passed, with correction for variations both in differential and in static pressure. If then shaft 100 be caused to drive a tally 23, it is merely a matter of proportioning of parts to obtain direct reading of the so corrected value.

There is still a third variable in the conditions which attend the measurement of gas: namely, temperature. The volume of a body of flowing gas, other things being equal, varies with the temperature and by the measurement formulæ for the orifice and other like indirect meters this variation is inversely as the square root of the absolute temperature. Hence, when temperature variation is important, as well as pressure variation, a third device, substantially identical with the other two, may be imposed on the second. The third cylinder may be connected integrally upon the driven shaft of the second, the lever arm of the third device may be made to swing in response to temperature variation, and the driven shaft of the third device may be connected to the tally. Then, the parts having been properly proportioned, a reading may be had correct for all three variables.

This arrangement is shown in Figs. I and II. In addition to the cylinders 5 and 55, arranged and operated in the manner already described, a third cylinder 555 is mounted upon the driven shaft 100, and a driven shaft 1000, associated with the cylinder 555, drives the tally 230. The lever 222, which controls operation in the manner described of the parts borne by and associated with the cylinder 555, swings in response to variation in the temperature of the gas under measurement, and to that end a Bourdon spring 26 is provided, responsive to temperature change of the gas and connected to the lever 222, in such manner as to swing it. The strips 888 and 999, with which the cylinder 555 is equipped, are so relatively positioned upon the cylinder that the space interval, circumferentially measured, at which the strips stand apart will, for every position of the brush borne by the lever 222, afford correction for temperature variation.

It suffices for present purposes to have explained one instrument for making summation through a prolonged interval of time of a plurality of variable quantities. Other instruments having the same general capability are described and alluded to in the specification of my prior application alluded to above.

In the operation of this instrument which has been here described, and in the operation of all instruments embodying the same principle of operation, it will be perceived that but for a provision in which my present invention is found, and which remains to be described, the load borne by the prime mover 6 is a variable load, and the fact will immediately be recognized by those acquainted with the operation of instruments of precision that it is desirable in such a situation that the load upon the prime mover shall be a constant one, or a substantially constant one, thus making for accuracy and uniformity of measurements. My present invention consists in providing for one or more of the rotating members 5, 55, etc., a load comparable in magnitude with the load borne by the movable member when its clutch is closed, which load shall bear upon the movable member while the clutch is open, but only while the clutch is open.

Referring to Figs. I and II, a drum 27 is mounted for rotation adjacent to and coaxially with drum 5. Advantageously, it is rotatable on antifriction bearings upon the hollow shaft 10, as shown in Fig. II. Free rotation of this drum is restrained by a spring-backed brake 28. The drum is so organized and arranged with the clutch mechanism already described that when the clutch arms 12 (which are formed of elastic material) are in retracted, that is to say, non-clutch-making position, they engage interiorly the drum 27, and, by virtue of such engagement, impose upon the prime mover 6 a braking effect, whose value is determined by the resilience with which the spring-backed brake 28 bears externally upon the drum 27. Advantageously, the drum 27 interiorly may be toothed as the disk 11 externally is toothed, and the arms 12 may bear detents cooperating with the interior face of the drum 7, to effect integrity of the temporary union of these parts, just as they are equipped with detents which effect integrity of union temporarily between themselves and the disk 11. The arms 12 then are effective in their alternate positions to impose upon the prime mover 6 either the burden of rotating the hollow shaft 10 and the cylinder 55, which is integrally mounted upon it, or the drum 27, upon which the brake 28 operates.

In Fig. I, I have shown such an intermittently effective load in association with drum 55, as well as that already described in association with the drum 5. I have not shown such a burden in association with the drum 555. The reason I have not done so is that the burdens imposed upon the prime mover by adding to the drum 5 the drums 55 and 555 are of relatively great magnitude, whereas the further burden imposed by driving the tally 230 is of relatively small magnitude, and practically does not require such compensation as has been described. Manifestly, however, in case of need, like burden-imposing elements, similarly operating, might be associated with drum 555.

I claim as my invention:

1. In apparatus for making summation of the value of a variable through prolonged intervals of time, a constantly moving member, a second movable member, braking means, and means for imposing alternately upon the constantly moving member the burden either of the movement of the second movable member or of the braking means.

2. In apparatus for making summation of the value of a variable through prolonged intervals of time, a prime mover, a rotatable member driven by said prime mover, a second rotatable member, braking means, and means for imposing upon the rotatable member first named the burden either of the movement of the second rotatable member or of the braking means, such uniting means being effective to impose upon the rotatable member first named the burden of the movement of the second rotatable member during a greater or less portion of one rotation of the rotatable member first named, according as the instant value of such variable is great or less.

3. In apparatus for making summation of the value of a variable through prolonged intervals of time, a prime mover, a rotatable member driven by said prime mover, a brake including a drum arranged adjacent said rotatable member, a movable arm borne by said rotatable member and normally engaging such brake drum, a second rotatable member coaxially mounted with the first, otherwise independent of the first in rotation, and adapted to be engaged by said arm in rotation-imparting engagement, and means effective during a greater or less portion of one rotation of the rotatable member first named, according as the instant value of such variable is great or less, for shifting said arm from engagement with such brake drum and to engagement with said second rotatable member.

4. In apparatus for affording indication of the quantity of gas flowing in a main the combination of a prime mover, a rotating cylinder constantly driven by said prime mover, braking means associated with said cylinder and including a drum, an arm borne by said cylinder and movable to and from engagement with said drum, a second rotatable member coaxially mounted with respect to said cylinder and normally independent thereof in rotation, means for shifting said arm out of engagement with said brake drum and into engagement with said second rotatable member and for maintaining it in the latter engagement during a greater or less portion of one rotation of the cylinder first named, according to the instant value of a variable characteristic of the gas as it flows.

In testimony whereof I have hereunto set my hand.

ARCHER E. YOUNG.